United States Patent
Ichinose et al.

(10) Patent No.: US 9,771,465 B2
(45) Date of Patent: Sep. 26, 2017

(54) POLYARYLENE SULFIDE RESIN COMPOSITION AND MOLDED ARTICLE COMPRISING SAME

(71) Applicant: TORAY INDUSTRIES, INC., Tokyo (JP)

(72) Inventors: Keiko Ichinose, Nagoya (JP); Hidenobu Takao, Nagoya (JP); Daisuke Yamamoto, Nagoya (JP); Koji Yamauchi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/107,655

(22) PCT Filed: Dec. 19, 2014

(86) PCT No.: PCT/JP2014/083698
§ 371 (c)(1),
(2) Date: Jun. 23, 2016

(87) PCT Pub. No.: WO2015/098748
PCT Pub. Date: Jul. 2, 2015

(65) Prior Publication Data
US 2016/0319099 A1    Nov. 3, 2016

(30) Foreign Application Priority Data

Dec. 25, 2013  (JP) .................................. 2013-267095
Mar. 20, 2014  (JP) .................................. 2014-057806
Aug. 7, 2014   (JP) .................................. 2014-161243

(51) Int. Cl.
*C08K 5/09*   (2006.01)
*C08K 5/098*  (2006.01)
*C08J 5/18*   (2006.01)

(52) U.S. Cl.
CPC .................. *C08K 5/098* (2013.01); *C08J 5/18* (2013.01); *C08J 2381/04* (2013.01)

(58) Field of Classification Search
CPC .......... C08K 5/098; C08J 5/18; C08J 2381/04

USPC ......................................................... 524/301
See application file for complete search history.

(56) References Cited

U.S. PATENT DOCUMENTS

| | | | | |
|---|---|---|---|---|
| 4,898,904 A | * | 2/1990 | Yu .......................... | C08K 5/098 524/327 |
| 8,076,447 B2 | | 12/2011 | Sato | |
| 8,329,832 B2 | | 12/2012 | Horiuchi | |
| 2009/0234068 A1 | * | 9/2009 | Horiuchi ............ | C08G 75/0277 524/609 |

FOREIGN PATENT DOCUMENTS

| | | | |
|---|---|---|---|
| JP | 63178164 | | 7/1988 |
| JP | 10195197 | | 7/1998 |
| JP | 10195197 A | * | 7/1998 |
| JP | 2005225931 | | 8/2005 |
| JP | 2011173953 | | 9/2011 |
| JP | 2012176607 | | 9/2012 |
| WO | 2007034800 | | 3/2007 |
| WO | 2008105438 | | 9/2008 |

OTHER PUBLICATIONS

International Search Report and Written Opinion of the International Searching Authority for International Application No. PCT/JP2014/083698 dated Feb. 10, 2015.

* cited by examiner

*Primary Examiner* — Hui Chin
(74) *Attorney, Agent, or Firm* — RatnerPrestia (57) ABSTRACT

A polyarylene sulfide resin composition including a polyarylene sulfide (A) and an alkaline earth metal organic carboxylate (B) in an amount of 0.001 to 10 mol % based on the formula —(Ar—S)—, a repeating unit of polyarylene sulfide, wherein the polyarylene sulfide (A) has a weight average molecular weight of 10,000 or more and a weight reduction during heating that satisfies the equation $\Delta Wr = (W_1 - W_2)/W_1 \times 100 \leq 0.18$ (%), wherein $\Delta Wr$ is a weight reduction ratio (%) determined by a thermogravimetric analysis performed in a non-oxidizing atmosphere under normal pressure at a temperature rise rate of 20° C./min from 50° C. to any temperature equal to or higher than 330° C., wherein $W_1$ is a sample weight at 100° C., and $W_2$ is a sample weight at 330° C.

10 Claims, 1 Drawing Sheet

POLYARYLENE SULFIDE RESIN COMPOSITION AND MOLDED ARTICLE COMPRISING SAME

CROSS-REFERENCE TO RELATED APPLICATIONS

This is the U.S. National Phase application of PCT International Application No. PCT/JP2014/083698, filed Dec. 19, 2014, and claims priority to Japanese Patent Application No. 2013-267095, filed Dec. 25, 2013, Japanese Patent Application No. 2014-057806, filed Mar. 20, 2014, and Japanese Patent Application No. 2014-161243, filed Aug. 7, 2014, the disclosures of each of these applications being incorporated herein by reference in their entireties for all purposes.

FIELD OF THE INVENTION

The present invention relates to a polyarylene sulfide resin composition having a lowered melt crystallization temperature, a retarded solidification rate, and excellent molding processability.

BACKGROUND OF THE INVENTION

In recent years, organic sulfide compounds, in particular, aliphatic sulfide compounds and aromatic sulfide compounds (e.g., thiols, thioketones, thioethers, and thio acids) have been receiving attention due to their unique physical properties and used for medicines, agricultural chemicals, industrial chemicals, and other applications. In addition, many aromatic high-molecular compounds containing sulfur as a bond (polyarylene sulfide, hereinafter also referred to as PAS for short) have been produced. PAS, typified by polyphenylene sulfide (hereinafter also referred to PPS as for short), is a resin having properties suitable for engineering plastics, such as excellent heat resistance, barrier properties, chemical resistance, electric insulation, moist heat resistance, and flame retardance. Thus, PAS can be molded by injection molding and extrusion molding into various molded parts such as films, sheets, and fibers and has been widely used in the fields of various electrical and electronic components, machine parts, automotive parts, and other parts requiring heat resistance and chemical resistance.

However, PAS, for its high heat resistance, is melt molded and used at high temperatures and, disadvantageously, tends to generate gas components. The generated gas components deposit on metal molds in melt molding or on spinnerets in melt spinning and melt film forming to lead to reduced productivity. Thus, there is a need to reduce the generation of gas components.

PATENT DOCUMENTS

In addition, PAS, which is commonly used as extrusion molded articles in fiber applications and film applications, is required to have a slow crystallization rate to reduce thread breakage in melt spinning and film breakage and cracking in melt film forming (Patent Document 1).

As a method of modifying the melt crystallization temperature of a PAS, proposed is mixing the PAS with metal carboxylates by melt compounding (Patent Document 2).

As a method of producing a PAS that generates a reduced amount of gas components during heating, proposed is a method of producing a PAS using, as a raw material, a prepolymer containing a cyclic polyarylene sulfide (Patent Document 3). This method does not require a solvent in producing a PAS, and the resulting PAS would contain little amount of impurity components other than PAS components. Thus, it is thought that a PAS that generates a reduced amount of gas components during heating can be produced.

Furthermore, the above method of producing a PAS using, as a raw material, a prepolymer containing a cyclic polyarylene sulfide, wherein a metal carboxylate is made to coexist to improve the polymerization rate is proposed (Patent Document 4).

Patent Document 1: JP 2005-225931 A
Patent Document 2: JP 63-178164 A
Patent Document 3: WO 2007/034800
Patent Document 4: JP 2011-173953 A

SUMMARY OF THE INVENTION

The PAS of Patent Document 1, however, is produced by a method in which a sulfur source, such as an alkali metal sulfide, and a dihalogenated aromatic compound are reacted in an organic solvent, such as N-methyl-2-pyrrolidone, in the presence of an alkali metal hydroxide in an amount of 1.00 to 1.09 moles per mole of the sulfur source, and after the reaction, washing is carried out twice or more such that the pH of the washing solution is controlled to be 8.0 to 11.0. The PAS produced by the production method of Patent Document 1 contains large amounts of low-molecular-weight components and thus has a very high polydispersity, the ratio of weight average molecular weight to number average molecular weight, meaning that its molecular weight distribution is wide. Thus, the PAS is disadvantageous in that large amounts of gas components are generated during heating, large amounts of components are eluted on contact with a solvent, and so on.

The PAS used in Patent Document 2 is produced by a method widely used as an industrial method of producing a PAS, in which an alkali metal sulfide, such as sodium sulfide, and a polyhalogenated aromatic compound, such as p-dichlorobenzene, are reacted in an organic amide solvent, such as N-methyl-2-pyrrolidone. Thus, the PAS contains large amounts of low-molecular-weight components similarly to the PAS of Patent Document 1 and is disadvantageous in that large amounts of gas components are generated during heating, large amounts of components are eluted on contact with a solvent, and so on.

The PAS produced by the method of Patent Document 3 crystallizes too fast, and its crystallization properties are difficult to control in melt spinning and melt film forming.

The method of Patent Document 4 does not at all consider the crystallization properties of PAS.

Thus, it is an object of the present invention to provide a polyarylene sulfide resin composition that contains a polyarylene sulfide produced in an economical and simple manner, has a lowered melt crystallization temperature and a retarded solidification rate, and generates little amount of gas components at high temperatures, which polyarylene sulfide resin composition has been difficult to achieve by conventional techniques.

To solve the problems described above, the polyarylene sulfide resin composition according to aspects of the present invention has the following structure:

A polyarylene sulfide resin composition comprising a polyarylene sulfide (A) and an alkaline earth metal organic carboxylate (B) in an amount of 0.001 to 10 mol % based on the formula —(Ar—S)—, a repeating unit of polyarylene sulfide, wherein the polyarylene sulfide (A) has a weight average molecular weight of 10,000 or more and a weight reduction during heating that satisfies the following equation.

$$\Delta Wr = (W_1 - W_2)/W_1 \times 100 \leq 0.18(\%)$$

In the equation, ΔWr is a weight reduction ratio (%) determined by a thermogravimetric analysis performed in a non-oxidizing atmosphere under normal pressure at a temperature rise rate of 20° C./min from 50° C. to any temperature equal to or higher than 330° C., wherein $W_1$ is a sample weight at 100° C., and $W_2$ is a sample weight at 330° C.

The molded article of embodiments of the present invention has the following structure:

A molded article made of the above polyarylene sulfide resin composition.

In the polyarylene sulfide resin composition of the present invention, the alkaline earth metal organic carboxylate (B) is preferably an alkaline earth metal carboxylate of up to 4 carbon atoms.

In the polyarylene sulfide resin composition of the present invention, the alkaline earth metal organic carboxylate (B) is preferably at least one selected from acetates and propionates.

In the polyarylene sulfide resin composition of the present invention, the alkaline earth metal organic carboxylate (B) is preferably an alkaline earth metal carboxylate of 5 or more carbon atoms.

In the polyarylene sulfide resin composition of the present invention, the alkaline earth metal organic carboxylate (B) is preferably at least one selected from stearates and benzoates.

In the polyarylene sulfide resin composition of the present invention, the alkaline earth metal organic carboxylate (B) is preferably at least one selected from calcium salts, barium salts, magnesium salts, and strontium salts.

In the polyarylene sulfide resin composition of the present invention, the polyarylene sulfide (A) is preferably a polyphenylene sulfide.

In the polyarylene sulfide resin composition of the present invention, the polyphenylene sulfide (A) is preferably a polyphenylene sulfide produced by thermally converting a polyphenylene sulfide prepolymer containing at least 50% by weight of a cyclic polyphenylene sulfide and having a weight average molecular weight of less than 10,000 into a high polymer having a weight average molecular weight of 10,000 or more, the cyclic polyphenylene sulfide being represented by Formula (i) below.

[Formula 1]

(i)

In the formula, m is an integer of 4 to 20, and the cyclic polyphenylene sulfide may be a mixture chemical compounds being represented by Formula (i) having different m of 4 to 20.

The molded article of the present invention is preferably in at least one form selected from fibers and films.

According to the present invention, a polyarylene sulfide resin composition can be provided that contains a polyarylene sulfide produced in an economical and simple manner, has a lowered melt crystallization temperature and a retarded solidification rate, and generates little amount of gas components at high temperatures.

DETAILED DESCRIPTION OF EMBODIMENTS OF THE INVENTION

Embodiments of the present invention will now be described in detail.

First, the polyarylene sulfide (A) for use in embodiments of the present invention and a method of producing the polyarylene sulfide (A) will be described.

(A) Polyarylene Sulfide

The PAS in the present invention is a homopolymer or copolymer containing the repeating unit of the formula —(Ar—S)— as the main structural unit, preferably containing the repeating unit in an amount of 80 mol % or more. Ar represents an aromatic group, and examples include units represented by the formulas (A) to (K) given below, among which the formula (A) is particularly preferred.

[Formula 2]

(A)

(B)

(C)

(D)

(E)

(R1 and R2 each represent a substituent selected from hydrogen, alkyl of 1 to 12 carbon atoms, alkoxy of 1 to 12 carbon atoms, arylene of 6 to 24 carbon atoms, and halogen, and R1 and R2 may be the same or different.)

As long as such a repeating unit is the main structural unit, the PAS can contain a small amount of branch units or crosslinking units represented, for example, by the formulas (L) to (N) given below. The amount of copolymerization of such branch units or crosslinking units is preferably in the range of 0 to 1 mol % per mol of the unit —(Ar—S)—.

[Formula 3]

The PAS in the present invention may be a random copolymer, a block copolymer, each containing any of the repeating unit given above, or a mixture thereof.

Typical examples include polyphenylene sulfides, polyphenylene sulfide sulfones, polyphenylene sulfide ketones, random copolymers and block copolymers thereof, and mixtures thereof. One particularly preferred PAS is a polyphenylene sulfide (hereinafter also referred to as PPS for short) containing, as the main structural unit of the polymer, p-phenylene sulfide units:

[Formula 4]

in an amount of 80 mol % or more, particularly 90 mol % or more.

The lower limit of the molecular weight of the PAS of the present invention is 10,000 or more by weight average, preferably 15,000 or more, and more preferably 18,000 or more. If the weight average molecular weight is less than 10,000, resulting molded articles cannot be provided with favorable toughness, high mechanical strength, high chemical resistance, or other properties. The upper limit of the weight average molecular weight is not limited to any particular value, but it is preferably less than 1,000,000, more preferably less than 500,000, and still more preferably less than 200,000. Weight average molecular weights in this range are preferred because high molding processability is easy to achieve.

The breadth of molecular weight distribution, i.e., polydispersity expressed as the ratio of weight average molecular weight to number average molecular weight (weight average molecular weight/number average molecular weight), of the PAS in the present invention is preferably 3.0 or less, more preferably 2.5 or less, still more preferably 2.3 or less, yet more preferably 2.1 or less, and particularly preferably 2.0 or less. When the polydispersity is in this range, the amount of low-molecular-weight components in the PAS is small, as a result of which, when the PAS is used in molding processing applications, high mechanical properties, reduction in the amount of gas component generated during heating, reduction in the amount of components eluted on contact with a solvent, and other benefits tend to be provided. The weight average molecular weight and the polydispersity can be determined, for example, by determining the molecular weight and the retention time of a reference material of known absolute molecular weight (polystyrene is used in this embodiment) using a size exclusion chromatography (SEC) apparatus equipped with a differential refractive index detector, and constructing a calibration curve from the relationship between the molecular weight and the retention time obtained. In the SEC measurement, 1-chloronaphthalene, which is capable of dissolving the copolymer of the present invention at a concentration of 0.05% by weight, can be used as an eluent. The temperature in the SEC measurement may be, for example, in the range of 50° C. to 250° C. and may vary depending on the elements constituting the SEC apparatus, such as columns and detectors (in this embodiment, the column temperature is 210° C.; the pre-thermostatic-temperature bath temperature is 250° C.; the pump thermostatic-temperature bath temperature is 50° C.; and the detector temperature is 210° C.).

The melt viscosity of the PAS of the present invention is not limited to any particular value, but typically, the melt viscosity is preferably, for example, in the range of 5 to 10,000 Pa·s (at 300° C. and a shear rate of 1,000/sec), and a PAS having a melt viscosity in this range tends to have excellent molding processability.

The main feature of the PAS for use in embodiments of the present invention is the weight reduction during heating satisfying the following equation (1).

$$\Delta Wr=(W_1-W_2)/W_1\times 100\leq 0.18(\%) \quad (1)$$

In the equation, $\Delta Wr$ is a weight reduction ratio (%) determined by a thermogravimetric analysis performed in a non-oxidizing atmosphere under normal pressure at a temperature rise rate of 20° C./min from 50° C. to any temperature equal to or higher than 330° C., wherein $W_1$ is a sample weight at 100° C., and $W_2$ is a sample weight at 330° C.

The $\Delta Wr$ of the PAS for use in embodiments of the present invention is 0.18% or less, preferably 0.12% or less, more preferably 0.10% or less, and still more preferably 0.085% or less. When the $\Delta Wr$ is more than 0.18%, for example, the amount of generated gas components (the gas generation amount) during molding processing of the PAS is increased, and furthermore, resulting molded articles will contain an increased amount of generated gas components, which are low-molecular-weight components, and therefore cannot be provided with satisfactory mechanical strength. In addition, large amounts of deposits are formed on spinnerets and dies during extrusion molding of the PAS and on metal molds during injection molding, resulting in reduced productivity. To the inventors' knowledge, known PAS has a $\Delta Wr$ of more than 0.18%. In contrast, the PAS for use in the present invention has a significantly low $\Delta Wr$ probably because it has an extremely narrow molecular weight distribution and an extremely low impurity content, unlike known PAS. A preferred method of producing the PAS for use in the present invention will be described later.

The $\Delta Wr$ can be determined by commonly used thermogravimetric analysis. The atmosphere used in this analysis is a non-oxidizing atmosphere under normal pressure. The term "non-oxidizing atmosphere" refers to an atmosphere in which the gas phase with which samples come into contact has an oxygen concentration of 5% by volume or less, preferably 2% by volume or less, and more preferably is substantially free of oxygen, i.e., an inert gas atmosphere such as nitrogen, helium, or argon. Of these, the nitrogen atmosphere is particularly preferred in terms of economic efficiency and ease of handling. The term "normal pressure" refers to a pressure in the atmosphere near standard temperature and pressure, specifically, an atmospheric pressure at a temperature near about 25° C. and an absolute pressure near 101.3 kPa. Measurements in atmospheres other than the above cannot simulate the practical use of PAS because, for example, PAS may be oxidized in the measurements, or the atmospheres are significantly different from the atmosphere actually used for the molding processing of PAS.

In the measurement of $\Delta Wr$, the thermogravimetric analysis is carried out in such a manner that the temperature is increased from 50° C. to any temperature equal to or higher than 330° C. at a temperature rise rate of 20° C./min. Preferably, the thermogravimetric analysis is carried out in such a manner that the temperature is held at 50° C. for 1 minute and then increased at a temperature rise rate of 20° C./min. This temperature range is a temperature range frequently used in the practical use of PAS including polyphenylene sulfide and also a temperature range frequently used when a PAS in the solid state is melted and then molded into any desired shape. The weight reduction ratio in such a practical temperature range is related, for example, to the amount of gas component generated from a PAS during practical use and the amount of deposit on spinnerets, metal molds, and the like during molding processing. Therefore, it can be said that a PAS having a lower weight reduction ratio in such a temperature range is a higher-quality and more excellent PAS. The measurement of $\Delta Wr$ is preferably carried out using a sample in an amount of about 10 mg, and the shape of the sample is preferably a fine granule of about 2 mm or less.

Such a PAS satisfying the above equation (1) is preferably produced, as described below, by thermally converting a polyarylene sulfide prepolymer containing a cyclic polyarylene sulfide into a high polymer. The conversion into a high polymer will be described in detail later. The weight fraction of the cyclic PAS contained in the PAS obtained by heating a polyarylene sulfide prepolymer containing a cyclic polyarylene sulfide is 40% or less, preferably 25% or less, and more preferably 15% or less. Such a PAS is preferred because it has a particularly small $\Delta Wr$ value.

The PAS for use in the present invention, which has an excellent feature of having a small weight reduction $\Delta Wr$ during the heating at an increasing temperature as described above, tends to also have an excellent feature of having a small weight reduction during the heating retained at any constant temperature.

The PAS for use in the present invention, when heated, preferably produces a significantly small amount of lactone compound and/or aniline compound. Examples of lactone compounds include β-propiolactone, β-butyrolactone, β-pentanolactone, β-hexanolactone, β-heptanolactone, β-octanolactone, β-nonalactone, γ-decalactone, γ-butyrolactone, γ-valerolactone, γ-pentanolactone, γ-hexanolactone, γ-heptanolactone, γ-octalactone, γ-nonalactone, γ-decalactone, δ-pentanolactone, δ-hexanolactone, δ-heptanolactone, δ-octanolactone, δ-nonalactone, and δ-decalactone. Examples of aniline compounds include aniline, N-methylaniline, N,N-dimethylaniline, N-ethylaniline, N-methyl-N-ethylaniline, 4-chloro-aniline, 4-chloro-N-methylaniline, 4-chloro-N,N-dimethylaniline, 4-chloro-N-ethylaniline, 4-chloro-N-methyl-N-ethylaniline, 3-chloro-aniline, 3-chloro-N-methylaniline, 3-chloro-N,N-dimethylaniline, 3-chloro-N-ethylaniline, and 3-chloro-N-methyl-N-ethylaniline.

The production of lactone compounds and/or aniline compounds during heating of a PAS is preferably as small as possible because it not only causes resin foaming, metal mold staining, and other problems during molding processing to reduce the molding processability but also causes pollution of the surrounding environment. Thus, the amount of production of lactone compounds is preferably 500 ppm or less, more preferably 300 ppm, still more preferably 100 ppm or less, and yet more preferably 50 ppm or less, based on the weight of a PAS that has not been heated. Likewise, the amount of production of aniline compounds is preferably 300 ppm or less, more preferably 100 ppm, still more preferably 50 ppm or less, and yet more preferably 30 ppm or less. One example of the method of determining the amount of production of lactone compounds and/or aniline compounds during heating of a PAS is a method in which gas components generated during a treatment in a non-oxidizing atmosphere at 320° C. for 60 minutes are separated using gas chromatography and quantitatively determined.

Method of Producing Polyarylene Sulfide

The PAS of the present invention can be produced, for example, using the method disclosed in WO 2007/034800 by thermally converting a polyarylene sulfide prepolymer containing at least 50% by weight of a cyclic polyphenylene sulfide and having a weight average molecular weight of less than 10,000 into a high polymer having a weight average molecular weight of 10,000 or more. Under this approach, the PAS for use in the present invention having the properties described above can be readily produced.

Cyclic Polyphenylene Sulfide

The cyclic polyphenylene sulfide used to produce the suitable PAS for use in embodiments of the present invention is a cyclic polyphenylene sulfide (hereinafter also referred to as a cyclic PPS for short) represented by Formula (i) below, where m is an integer of 4 to 20. The cyclic polyphenylene sulfide may be a mixture chemical compounds being represented by Formula (i) having different m of 4 to 20.

[Formula 5]

(i)

The cyclic polyphenylene sulfide may be either a single compound having a single repeat number or a mixture of cyclic polyphenylene sulfides having different repeat numbers. However, the mixture of cyclic polyphenylene sulfides having different repeat numbers tends to have a lower melting temperature than the single compound having a single repeat number, and using the mixture of cyclic polyphenylene sulfides having different repeat numbers is preferred because the temperature during the conversion into a high polymer described below can be lower.

Polyarylene Sulfide Prepolymer

The suitable PAS for use in the present invention can be produced as described above by thermally converting a polyarylene sulfide prepolymer containing a cyclic polyphenylene sulfide into a high polymer. The polyarylene sulfide prepolymer used here contains a cyclic polyphenylene sulfide in an amount of at least 50% by weight, preferably 70% by weight or more, more preferably 80% by weight or more, and still more preferably 90% or more. The upper limit of the amount of cyclic polyphenylene sulfide contained in the polyarylene sulfide prepolymer is not limited to any particular value, but, for example, it is preferably not more than 98% by weight. Typically, the higher the weight percentage of the cyclic polyphenylene sulfide in the polyarylene sulfide prepolymer is, the higher the degree of polymerization and melt viscosity of the heated PAS tend to be. In other words, in the method of producing the PAS of the present invention, the degree of polymerization and melt viscosity of the resulting PAS can be readily controlled by controlling the percentage of the cyclic polyphenylene sulfide in the polyarylene sulfide prepolymer. When the weight percentage of the cyclic polyphenylene sulfide in the polyarylene sulfide prepolymer is over the above upper limit, the melting temperature of the polyarylene sulfide prepolymer tends to be high. Thus, controlling the weight percentage of the cyclic polyphenylene sulfide in the polyarylene sulfide prepolymer within the above range is preferred because the temperature during the conversion of the polyarylene sulfide prepolymer into a high polymer can be lower.

The component other than the cyclic polyphenylene sulfide in the polyarylene sulfide prepolymer is particularly preferably a linear polyarylene sulfide oligomer. As used herein, the term "linear polyarylene sulfide oligomer" refers to a homooligomer or cooligomer containing the repeating unit of the formula —(Ar—S)— as the main structural unit, preferably containing the repeating unit in an amount of 80 mol % or more. Ar represents an aromatic group, and examples include the units represented by the formulas (A) to (K) given above. Of these, the formula (A) is particularly preferred. As long as such a repeating unit is the main structural unit, the linear polyarylene sulfide oligomer can contain a small amount of branch units or crosslinking units represented, for example, by the formulas (L) to (N) given above. The amount of copolymerization of such branch units or crosslinking units is preferably in the range of 0 to 1 mol % per mol of the unit —(Ar—S)—. The linear polyarylene sulfide oligomer may be a random copolymer, a block copolymer, each containing any of the repeating unit given above, or a mixture thereof.

Typical examples include polyphenylene sulfide oligomers, polyphenylene sulfide sulfone oligomers, polyphenylene sulfide ketone oligomers, random copolymers and block copolymers thereof, and mixtures thereof. One particularly preferred linear polyarylene sulfide oligomer is a linear polyarylene sulfide oligomer containing, as the main structural unit of the polymer, p-phenylene sulfide units in an amount of 80 mol % or more, particularly 90 mol % or more.

The amount of linear polyarylene sulfide contained in the polyarylene sulfide prepolymer is particularly preferably smaller than the amount of cyclic polyphenylene sulfide contained in the polyarylene sulfide prepolymer. In other words, the weight ratio of the cyclic polyphenylene sulfide to the linear polyarylene sulfide (cyclic polyphenylene sulfide/linear polyarylene sulfide) in the polyarylene sulfide prepolymer is preferably 1 or greater, more preferably 2.3 or greater, still more preferably 4 or greater, and yet more preferably 9 or greater. By using such a polyarylene sulfide prepolymer, a polyarylene sulfide having a weight average molecular weight of 10,000 or more can be readily obtained. Therefore, the greater the weight ratio of the cyclic polyphenylene sulfide to the linear polyarylene sulfide in the polyarylene sulfide prepolymer is, the larger the weight average molecular weight of the suitable PAS for use in the present invention tends to be. The upper limit of this weight ratio is not limited, but to produce a polyarylene sulfide prepolymer with the weight ratio being greater than 100, it is necessary to significantly reduce the amount of linear PAS in the polyarylene sulfide prepolymer, which requires much labor. According to the preferred method of producing the PAS of the present invention, a sufficiently high-molecular-weight PAS can be readily obtained if a polyarylene sulfide prepolymer with the weight ratio being not greater than 100 is used.

The upper limit of the molecular weight of the polyarylene sulfide prepolymer used to produce the suitable PAS for use in embodiments of the present invention is less than 10,000 by weight average, preferably 5,000 or less, and more preferably 3,000 or less, whereas the lower limit is preferably 300 or more by weight average, more preferably 400 or more, and still more preferably 500 or more.

In the thermal conversion into a high polymer, various catalyst components for promoting the conversion may be added to the polyarylene sulfide prepolymer. As such catalyst components, various zero-valent transition metal compounds disclosed, for example, in JP 2012-176607 A may be used, and preferred zero-valent transition metals are metals from Group 8 to Group 11 and from Period 4 to Period 6 of the periodic table. Examples of such metal species include nickel, palladium, platinum, iron, ruthenium, rhodium, copper, silver, and gold. Suitable zero-valent transition metal compounds are various complexes, and examples include complexes containing, as a ligand, triphenylphosphine, tri-t-butylphosphine, tricyclohexylphosphine, 1,2-bis(diphenylphosphino) ethane, 1,1'-bis(diphenylphosphino) ferrocene, dibenzylideneacetone, dimethoxydibenzylideneacetone, cyclooctadiene, or carbonyl. Specific examples include bis(dibenzylideneacetone) palladium, tris(dibenzylideneacetone) dipalladium, tetrakis(triphenylphosphine) palladium, bis(tri-t-butylphosphine) palladium, bis[1,2-bis(diphenylphosphino)ethane] palladium, bis(tricyclohexylphosphine) palladium, [P,P'-1,3-bis(di-i-propylphosphino)propane][P-1,3-bis(di-i-propylphosphino)propane] palladium, 1,3-bis(2,6-di-i-propylphenyl)imidazol-2-ylidene(1,4-naphthoquinone) palladium dimers, 1,3-bis(2,4,6-trimethylphenyl)imidazol-2-ylidene(1,4-naphthoquinone) palladium dimers, bis(3,5,3',5'-dimethoxydibenzylideneacetone) palladium, bis(tri-t-butylphosphine) platinum, tetrakis(triphenylphosphine) platinum, tetrakis(trifluorophosphine) platinum, ethylenebis(triphenylphosphine) platinum, platinum-2,4,6,8-tetramethyl-2,4,6,8-tetravinylcyclotetrasiloxane complexes, tetrakis(triphenylphosphine) nickel, tetrakis(triphenyl phosphite) nickel, bis(1,5-cyclooctadiene) nickel, dodecacarbonyltriiron, pentacarbonyliron, dodecacarbonyltetrarhodium, hexadecacarbonylhexarhodium, and dodecacarbonyltriruthenium. These polymerization catalysts may be used alone, or two or more of them may be used as a mixture or in combination. When such a zero-valent transition metal compound is used as a catalyst component, the polyarylene sulfide prepolymer can be converted into a high polymer in a short time, which can advantageously reduce the generation of gas components due to undesirable side reactions.

Method of Producing Polyarylene Sulfide Prepolymer

The above polyarylene sulfide prepolymer can be produced, for example, by the methods disclosed in WO 2008/105438, specifically, the following methods.

(1) A mixture containing at least a polyhalogenated aromatic compound, a sulfidizing agent, and an organic polar solvent is heated to polymerize a polyarylene sulfide resin. A mixture containing a granular PAS resin separable by an 80-mesh sieve (opening: 0.125 mm), a PAS component other than the granular PAS resin (referred to as a polyarylene sulfide oligomer), which has been produced through the polymerization, an organic polar solvent, water, and a halogenated alkali metal salt is then prepared. The polyarylene sulfide oligomer contained in the mixture obtained is then recovered by separation and purified to produce a polyarylene sulfide prepolymer.

(2) A mixture containing at least a polyhalogenated aromatic compound, a sulfidizing agent, and an organic polar solvent is heated to polymerize a polyarylene sulfide resin. After completion of the polymerization, the organic polar solvent is removed by any known method. A mixture containing the polyarylene sulfide resin, water, and a halogenated alkali metal salt is then prepared. The mixture obtained is then purified by any known method to prepare a polyarylene sulfide resin containing a polyarylene sulfide prepolymer. The polyarylene sulfide prepolymer is recovered by extraction using a solvent that substantially does not dissolve the polyarylene sulfide resin but dissolves the polyarylene sulfide prepolymer.

Conversion of Polyarylene Sulfide Prepolymer into High Polymer

The PAS of the present invention described above is preferably produced by thermally converting the above-described polyarylene sulfide prepolymer into a high polymer. The temperature during the heating is preferably a temperature at which the polyarylene sulfide prepolymer melts, and there are no particular limitations as long as such temperature conditions are satisfied. A heating temperature in this preferred range gives a PAS in a short time. Although the temperature at which the polyarylene sulfide prepolymer melts varies depending on the composition and molecular weight of the polyarylene sulfide prepolymer and the environment during heating, the melting temperature can be estimated, for example, by analyzing the polyarylene sulfide prepolymer using a differential scanning calorimeter. However, an excessively high heating temperature tends to cause undesirable side reactions such as crosslinking reactions and degradation reactions, for example, between the polyarylene sulfide prepolymers, between the PAS produced by heating, and between the PAS and the polyarylene sulfide prepolymer, which can lead to reduced properties of the resulting PAS. Thus, it is desirable to avoid heating temperatures that clearly cause such undesirable side reactions. The heating temperature is, for example, 180° C. to 400° C., preferably 200° C. to 380° C., and more preferably 250° C. to 360° C.

The time for the heating varies depending on the various properties, such as the content, the number of m, and the molecular weight of the cyclic polyarylene sulfide in the polyarylene sulfide prepolymer used, and on the conditions such as heating temperature. The time for the heating is preferably set so as to minimize the above undesirable side reactions. The heating time is, for example, 0.05 to 100 hours, preferably 0.1 to 20 hours, and more preferably 0.1 to 10 hours. A heating time of shorter than 0.05 hour tends to result in an insufficient conversion of the polyarylene sulfide prepolymer into a PAS, and a heating time of longer than 100 hours tends to increase the possibility of manifesting adverse effects of the undesirable side reactions on the properties of the resulting PAS and may also lead to economic disadvantages.

The thermal conversion of the polyarylene sulfide prepolymer into a high polymer is typically carried out in the absence of a solvent but may also be carried out in the presence of a solvent. Any solvent may be used that does not inhibit the thermal conversion of the polyarylene sulfide prepolymer into a high polymer or does not substantially cause any undesirable side reactions such as degradation and crosslinking of the produced PAS. Examples of solvents include nitrogen-containing polar solvents such as N-methyl-2-pyrrolidone, dimethylformamide, and dimethylacetamide; sulfoxide/sulfone solvents such as dimethyl sulfoxide and dimethyl sulfone; ketone solvents such as acetone, methyl ethyl ketone, diethyl ketone, and acetophenone; ether solvents such as dimethyl ether, dipropyl ether, and tetrahydrofuran; halogen solvents such as chloroform, methylene chloride, trichloroethylene, ethylene dichloride, dichloroethane, tetrachloroethane, and chlorobenzene; alcohol/phenol solvents such as methanol, ethanol, propanol, butanol, pentanol, ethylene glycol, propylene glycol, phenol, cresol, and polyethylene glycol; and aromatic hydrocarbon solvents such as benzene, toluene, and xylene. Inorganic compounds such as carbon dioxide, nitrogen, and water in the form of a supercritical fluid can also be used as a solvent. These solvents can be used alone or in a combination of two or more.

The thermal conversion of the polyarylene sulfide prepolymer into a high polymer may, as a matter of course, be carried out using a commonly used polymerization reactor and may further be carried out using any apparatus equipped with a heating mechanism, such as molds for producing molded articles, compounding extruders, and melt compounding machines, and known systems such as a batch method and a continuous method can be employed.

The thermal conversion of the polyarylene sulfide prepolymer into a high polymer is preferably carried out in a non-oxidizing atmosphere, and reduced pressure conditions are also preferred. When the conversion is carried out under reduced pressure conditions, it is preferable to bring the atmosphere in the reaction system once under a non-oxidizing atmosphere before establishing reduced pressure conditions. This tends to reduce the occurrence of undesirable side reactions such as crosslinking reactions and degradation reactions, for example, between the polyarylene sulfide prepolymers, between the PAS produced by heating, and between the PAS and the polyarylene sulfide prepolymer. The term "non-oxidizing atmosphere" refers to an atmosphere in which the gas phase with which a polyarylene sulfide prepolymer comes into contact has an oxygen concentration of 5% by volume or less, preferably 2% by volume or less, and more preferably is substantially free of oxygen, i.e., an inert gas atmosphere such as nitrogen, helium, or argon, among which the nitrogen atmosphere is particularly preferred in terms of economic efficiency and ease of handling. "Under reduced pressure conditions" means that the pressure in the reaction system is lower than atmospheric pressure, and the upper limit is preferably 50 kPa or lower, more preferably 20 kPa or lower, and still more preferably 10 kPa or lower. The lower limit is, for example, 0.1 kPa or higher. Under reduced pressure conditions in this preferred range, undesirable side reactions such as crosslinking reactions are unlikely to occur, and, in addition, low-molecular-weight cyclic polyarylene sulfide contained in the polyarylene sulfide prepolymer is unlikely to vaporize.

The present invention, according to exemplary embodiments, includes the polyarylene sulfide (A) and an alkaline earth metal organic carboxylate (B) in an amount of 0.001 to 10 mol % based on the formula —(Ar—S)—, a repeating unit of polyarylene sulfide. The alkaline earth metal organic carboxylate (B) will be described below.

(B) Alkaline Earth Metal Organic Carboxylate

The alkaline earth metal organic carboxylate (B) in embodiments of the present invention is a compound represented by Formula R(COOM)n. In the formula, R is alkyl, cycloalkyl, aryl, arylalkyl, or alkylaryl of 1 to 20 carbon atoms, among which alkyl, arylalkyl, and alkylaryl are preferred, and alkyl is particularly preferred.

When the alkaline earth metal organic carboxylate (B) is an alkaline earth metal organic carboxylate of up to 4 carbon atoms, the amount of gas component generated during heating of a PAS described above is, advantageously, particularly small. Specific examples include alkaline earth metal acetates, alkaline earth metal propionates, and alkaline earth metal butyrates. Of these, alkaline earth metal acetates and alkaline earth metal propionates are preferred.

When the alkaline earth metal organic carboxylate (B) is an organic alkaline earth metal salt of 5 or more carbon atoms, the dispersibility in the polyarylene sulfide (A) advantageously tends to be high, as a result of which a lowered melt crystallization temperature and a retarded solidification rate of the PAS, the effects of the present invention, tend to be achieved. Alkaline earth metal organic carboxylates of 6 to 24 carbon atoms are more preferred, and those of 7 to 18 carbon atoms are still more preferred. When the number of carbon atoms is in this preferred range, the gas generation amount of the resulting resin composition is less likely to be large. Specific examples include alkaline earth metal valerates, alkaline earth metal caproates, alkaline earth metal stearates, alkaline earth metal lignocerates, alkaline earth metal melissates, alkaline earth metal citrates, alkaline earth metal benzoates, alkaline earth metal phenyl acetates, and alkaline earth metal p-toluates. Of these, alkaline earth metal salt caproates, alkaline earth metal stearates, alkaline earth metal lignocerates, alkaline earth metal benzoates, alkaline earth metal phenyl acetates, and alkaline earth metal p-toluates are preferred. Alkaline earth metal stearates, alkaline earth metal benzoates, alkaline earth metal phenyl acetates, and alkaline earth metal p-toluates are more preferred. Alkaline earth metal stearates and alkaline earth metal benzoates are still more preferred.

In the above formula, M represents an alkaline earth metal, and, in particular, calcium, magnesium, barium, and strontium are preferred. In the above formula, n is an integer of 1 to 3. These alkaline earth metal organic carboxylates may be used alone, or two or more of them may be used as a mixture or in combination.

The amount of alkaline earth metal organic carboxylate (B) selected is in the range of 0.001 to 10 mol %, more preferably in the range of 0.01 to 5 mol %, and still more preferably 0.01 to 3 mol %, based on —(Ar—S)—, a repeating unit of the polyarylene sulfide (A). When the amount is less than 0.001 mol %, benefits such as a lowered melt crystallization temperature and a retarded solidification rate cannot be provided, and when the amount is more than 10 mol %, adverse effects, such as reduced mechanical strength of resulting molded articles, are produced.

As used herein, the term "melt crystallization temperature" refers to an exothermic peak during cooling in First Run as measured using a differential scanning calorimeter. The solidification temperature as used herein can be determined using a rheometer. Specifically, the PAS resin composition is melted by heating to 320° C. in a nitrogen atmosphere and then cooled from 320° C. at 10° C./min. In this cooling process, the midpoint between two inflection points that appear as the PAS resin composition solidifies is a solidification temperature.

The method of blending the polyarylene sulfide (A) with the alkaline earth metal organic carboxylate (B) includes (1) blending by melt compounding and (2) blending by coexistence during the conversion of the polyarylene sulfide prepolymer into a high polymer.

For (1) blending by melt compounding, any known method can be used. Typical examples include a method involving feeding into a generally known melt compounding machine, such as single-screw, twin-screw compounding extruder, banbury mixer, kneader, or roller mixer, and kneading at a processing temperature 5° C. to 100° C. higher than the melting point of the PAS resin.

In (2) blending by coexistence during the conversion of the polyarylene sulfide prepolymer into a high polymer, the blending may be performed by any method. The thermal conversion into a high polymer may be carried out after the polyarylene sulfide prepolymer and the alkaline earth metal organic carboxylate (B) are mixed at room temperature, or the alkaline earth metal organic carboxylate (B) may be added during the process of thermally converting the polyarylene sulfide prepolymer into a high polymer.

In addition, to the PAS resin composition of the present invention, glass fibers, carbon fibers, graphite fibers, aramid fibers, silicon carbide fibers, alumina fibers, boron fibers, and other fibers can be added by the above melt compounding without impairing the effects of the present invention. Furthermore, the following compounds can be added for the purpose of modification. Commonly used additives can be added such as plasticizers such as polyalkylene oxide oligomer compounds, thioether compounds, ester compounds, and organophosphorus compounds; crystal nucleating agents such as talc, kaolin, organophosphorus compounds, and polyether ether ketone; mold-releasing agents such as montanic acid waxes, ethylenediamine/stearic acid/sebacic acid polycondensates, and silicone compounds; antitarnish agents such as hypophosphites; lubricants; UV inhibitors; coloring agents; and foaming agents. In the embodiments of the present invention, any of the above compounds exceeding 20% by weight of the whole composition disadvantageously compromises the properties intrinsic to PAS resin, and the amount of addition is preferably not more than 10% by weight, still more preferably not more than 1% by weight.

In the above melt compounding, the materials may be mixed in any order. Any method may be used such as a method in which all the materials are blended and then melt compounded as described above; a method in which some materials are blended and then melt compounded as described above, and other materials are further blended and melt compounded; or a method in which some materials are blended and then melt compounded in a single-screw or twin-screw compounding extruder, and during the melt compounding, other materials are mixed using a side feeder. Additive components in small amounts may, of course, be added after other components are kneaded and pelletized, for example, by the above method and before molding is performed.

For the composition of the present invention, a method can also be employed in which a blend in a solid state is compressed into tablets and subjected to molding such as injection molding.

The PAS resin composition produced by the present invention has excellent mechanical properties, low gas generation, and excellent heat resistance, chemical resistance, electrical properties, and mechanical properties, and can be used in injection molding, injection compression molding, and blow molding applications as well as extrusion molding to be molded into extrusion molded articles such as sheets, films, fibers, and pipes. In particular, the composition of the present invention having a controlled crystallization rate is suitable for use in films and fibers.

EXAMPLES

The present invention will now be described in more detail with reference to examples. It should be noted that these examples are for illustration purposes only and should not be construed as limiting.

Measurement of Molecular Weight

The molecular weight of a polyarylene sulfide and a polyarylene sulfide prepolymer was determined by gel permeation chromatography (GPC), a type of size exclusion chromatography (SEC), in terms of polystyrene. The measurement conditions of GPC are given below.

Apparatus: SSC-7100 available from Senshu Scientific Co., Ltd.
Column: GPC 3506 available from Senshu Scientific Co., Ltd.
Eluent: 1-chloronaphthalene
Detector: differential refractive index detector
Column temperature: 210° C.
Pre-thermostatic bath temperature: 250° C.
Pump thermostatic bath temperature: 50° C.
Detector temperature: 210° C.
Flow rate: 1.0 mL/min Determining Weight Reduction Ratio during Heating of PAS The weight reduction ratio during heating of a polyarylene sulfide was determined under the following conditions using a TGA7 thermogravimetric analyzer available from Perkin Elmer Co., Ltd. Fine granules of 2 mm or less were used as samples.
Measurement atmosphere: under nitrogen stream
Weight of sample loaded: about 10 mg
Measurement conditions:
(a) Hold at a programmed temperature of 50° C. for 1 minute.
(b) Raise the temperature from the program temperature of 50° C. to 400° C. at a temperature rise rate of 20° C./min.

The weight reduction ratio $\Delta Wr$ was calculated using the above equation (1) from a sample weight at 100° C. and a sample weight at 330° C. during the temperature rise of (b).

Analyzing Gas Components Generated during Heating of PAS

Components generated during heating of a PAS were quantitatively determined by the following method. Fine granules of 2 mm or less were used as samples.
(a) Collecting Gas Generated during Heating About 10 mg of a PAS was heated under a stream of nitrogen (50 ml/min) at 320° C. for 60 minutes, and gas components generated were collected on a carbotrap 400 air sampling and thermal desorption tube.
(b) Analyzing Gas Components Gas components collected on the tube were thermally desorbed using a TDU thermal desorber (Supelco Inc.) by raising the temperature from room temperature to 280° C. over 5 minutes. The components thermally desorbed were separated using gas chromatography, and ybutyrolactone and 4-chloro-N-methylaniline in the gas were quantitatively determined.

Thermal Properties of PAS Resin Composition

Using a Robot DSC RDC220 available from Seiko Instruments Inc. as a differential scanning calorimeter, thermal properties of a polyarylene sulfide resin composition were determined in a nitrogen atmosphere. The measurement conditions were as described below. The endothermic peak value in Second Run was used as a melting point, and the exothermic peak value in First Run was used as a cooling-down melt crystallization temperature.

First Run
Hold at 50° C. for 1 min.
Raise the temperature from 50° C. to 340° C. at a temperature rise rate of 20° C./min.
After the temperature rise, hold for 1 min.
Cool to 50° C. at a cooling rate of 20° C./min.

Second Run
Hold at 50° C. for 1 min.
Raise the temperature from 50° C. to 340° C. at a temperature rise rate of 20° C./min.

Solidification Temperature of PAS Resin Composition

The solidification temperature of a polyarylene sulfide resin composition was determined in a nitrogen atmosphere using a Physica MCR501 rheometer available from Anton Paar. The measurement conditions were as described below. The intermediate temperature between two inflection points that appear during the cooling process was used as the solidification temperature.
Plate: parallel plate 25 mm in diameter
Measurement mode: vibration
Shear stress: $\tau$=constant 1000 Pa
Frequency: f=1 Hz Temperature program: from 320° C. to 120° C. (10° C./min)

Crystal Observation of PAS Resin Composition

On a TH-600PM microscopic temperature-controlled stage available from Linkam Scientific Instruments Ltd., a polymer was gently placed with a cover glass thereon. After being held at 340° C. for 1 minute, the PAS resin composition was cooled at 20° C./min, and crystal observation was performed at 230° C. using an OPTIPHOTO-POL polarizing microscope (objective lens: 40×, eyepiece: 5×) available from Nikon Precision Inc.

Reference Example 1

Preparing PAS Mixture-Containing Slurry

Into a stainless-steel reactor 1 equipped with a stirrer, 1,169 kg (10 kmol) of a 48% aqueous sodium hydrosulfide solution, 841 kg (10.1 kmol) of a 48% aqueous sodium hydroxide solution, 1,983 kg (20 kmol) of N-methyl-2-pyrrolidone (hereinafter also referred to as NMP for short), and 322 kg (1.96 kmol) of a 50% aqueous sodium acetate solution were loaded. At normal pressure under nitrogen, the mixture was gradually heated to about 240° C. over about three hours, and 1,200 kg of water and 26 kg of NMP were distilled out through a rectifying tube. During this dewatering operation, 0.02 mole of hydrogen sulfide per mole of the sulfur component loaded stripped out of the system.

Next, after cooling to about 200° C., the contents were transferred to another stainless-steel reactor 2 equipped with a stirrer. NMP in an amount of 932 kg was loaded into the reactor 1 to wash the inside, and the washing solution was transferred to the reactor 2. Next, 1,477 kg (10.0 kmol) of p-dichlorobenzene was added into the reactor 2. The reactor was hermetically sealed under nitrogen gas and heated to 200° C. with stirring. The temperature was then raised from 200° C. to 270° C. at a rate of 0.6° C./min and maintained at this temperature for 140 minutes. While injecting 353 kg (19.6 kmol) of water over 15 minutes, the mixture was cooled to 250° C. at a rate of 1.3° C./min. The mixture was then cooled to 220° C. at a rate of 0.4° C./min and rapidly cooled to about 80° C. to give a slurry (A).

The slurry (A) was diluted with 2,623 kg of NMP to give a slurry (B). The slurry (B) heated to 80° C. was filtered through a sieve (80 mesh, opening: 0.175 mm) to give a slurry-containing granular PPS resin, the mesh-on component, and a slurry (C), the filtrate component.

Reference Example 2

Preparing PAS Mixture

The slurry (C) obtained in Reference Example 1 in an amount of 1,000 kg was loaded into a stainless-steel reactor. The reactor was purged with nitrogen, and the mixture was treated under reduced pressure at 100° C. to 150° C. for about 1.5 hours with stirring to remove most of the solvent.

Thereafter, ion-exchanged water in an amount of 1,200 kg (the amount 1.2 times that of the slurry (C)) was added, and then the mixture was stirred at about 70° C. for 30 minutes into a slurry. The slurry was filtered to give a white solid. To the solid obtained, 1,200 kg of ion-exchanged water was added. The mixture was stirred at 70° C. for 30 minutes again into a slurry, and the slurry was filtered, dried in a nitrogen atmosphere at 120° C., and then vacuum dried at 80° C. to give 11.6 kg of a dry solid.

The absorption spectrum of the solid obtained by infrared spectroscopy showed that the solid was a polyphenylene sulfide mixture composed of phenylene sulfide units. The polyphenylene sulfide mixture was subjected to GPC, and the analysis of the chromatogram showed that the weight fraction of components having a molecular weight of 5,000 or less was 39% and the weight fraction of components having a molecular weight of 2,500 or less was 32%.

Reference Example 3

Preparing Cyclic Polyphenylene Sulfide Mixture

A 10 kg aliquot of the PAS mixture 1 obtained by the procedure of Reference Example 2 was taken. Using 150 kg of chloroform as a solvent, the polyphenylene sulfide mixture and the solvent were brought into contact by stirring at normal pressure under reflux for 1 hour. Thereafter, solid-liquid separation was performed using hot filtration to give an extract. To the solid separated, 150 kg of chloroform was added, and the mixture was stirred at normal pressure under reflux for 1 hour, after which solid-liquid separation was performed similarly using hot filtration to give an extract, which was mixed with the extract previously obtained. The resulting extract was a slurry that contains partially solid components at room temperature.

The extract slurry was treated under reduced pressure, whereby portions of chloroform were distilled off to the extract weight of about 40 kg to give a slurry. This slurry mixture was then added dropwise to 600 kg of methanol with stirring. The resulting precipitate was filtered to recover a solid, and then the solid was vacuum dried at 80° C. to give 3.0 kg of white powder. The yield of the white powder was 30% based on the polyphenylene sulfide mixture used.

The absorption spectrum of the white powder obtained by infrared spectroscopy showed that the white powder was a compound composed of phenylene sulfide units. Furthermore, components separated using an LC-10 high-performance liquid chromatography apparatus (Shimadzu Corporation, column: C18, detector: photodiode array) were analyzed using an M-1200H mass spectrum analyzer (Hitachi, Ltd.) and further MALDI-TOF-MS. The molecular weight information obtained showed that the white powder was a mixture composed mainly of a cyclic polyphenylene sulfide of 4 to 12 repeating units, and the weight fraction of the cyclic polyphenylene sulfide was about 94%. The mixture was subjected to GPC, showing that the weight average molecular weight was 900.

Reference Example 4

Preparing Granular PAS

Here, description is given on the preparation of a granular PAS according to the related art.

To 100 kg of the slurry-containing granular PPS resin obtained in Reference Example 1, about 250 kg of NMP was added, and the mixture was washed at 85° C. for 30 minutes and filtered through a sieve (80 mesh, opening: 0.175 mm). The resulting solid was diluted with 500 kg of ion-exchanged water and stirred at 70° C. for 30 minutes, and then the resultant was filtered with an 80-mesh sieve to recover a solid. This procedure was repeated five times. The solid thus obtained was dried in a nitrogen atmosphere at 130° C. to give a granular polyphenylene sulfide.

The granular PPS resin obtained was completely soluble in 1-chloronaphthalene at 210° C. The GPC measurement showed that the weight average molecular weight was 48,600 and the polydispersity was 2.66. The weight reduction ratio during heating ($\Delta Wr$) of the resulting product was measured to be 0.23%. Furthermore, for the PPS obtained here, gas components generated during heating were analyzed to show that 618 ppm of ybutyrolactone and 416 ppm of 4-chloro-N-methylaniline were detected, the ppm being based on the weight of the PPS that had not been heated.

Example 1

The cyclic polyphenylene sulfide mixture obtained in Reference Example 3 in an amount of 10 g and calcium acetate in an amount of 1.6 mg (0.01 mol % based on -(Ph-S)—, the repeating unit of the PPS) were placed in a test tube equipped with a stirring blade, a vacuum adapter, a vacuum stirrer, and a nitrogen inlet tube. The pressure in the system was reduced, and then the atmosphere was purged with nitrogen. This procedure was repeated three times. While being stirred under reduced pressure, the mixture was maintained at 340° C. for 6 hours. The stirring was stopped, and the mixture was allowed to cool to give a polymer. The polymer obtained was shown to have a polyphenylene sulfide structure by the absorption spectrum obtained by infrared spectroscopy. The PPS resin composition obtained was subjected to GPC and shown to have a weight average molecular weight of 54,800 and a polydispersity of 2.21. The weight reduction ratio during heating ($\Delta$Wr) of the PPS resin composition obtained was measured to be 0.044%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 282° C. and 208° C., respectively. Using a rheometer, the solidification temperature was measured to be 243° C.

Example 2

A polymer was obtained in the same manner as in Example 1 except that the cyclic polyphenylene sulfide mixture obtained in Reference Example 3 in an amount of 4.0 g and calcium acetate in an amount of 6.5 mg (0.1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 53,900 and a polydispersity of 2.32. The weight reduction ratio during heating ($\Delta$Wr) of the PPS resin composition obtained was measured to be 0.034%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 285° C. and 190° C., respectively. Using a rheometer, the solidification temperature was measured to be 231° C.

Example 3

A polymer was obtained in the same manner as in Example 1 except that the cyclic polyphenylene sulfide mixture obtained in Reference Example 3 in an amount of 3.9 g and calcium acetate in an amount of 62.9 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 55,900 and a polydispersity of 2.40. The weight reduction ratio during heating ($\Delta$Wr) of the PPS resin composition obtained was measured to be 0.033%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 282° C. and 184° C., respectively. Using a rheometer, the solidification temperature was measured to be 221° C.

Example 4

A polymer was obtained in the same manner as in Example 1 except that the PPS obtained in Reference Example 3 in an amount of 4.0 g and calcium acetate in an amount of 193.7 mg (3 mol % based on -(Ph-S)—, the repeating unit of the PPS) were used. The polymer obtained was shown to have a polyphenylene sulfide structure by the absorption spectrum obtained by infrared spectroscopy. The PPS resin composition obtained was subjected to GPC and shown to have a weight average molecular weight of 56,200 and a polydispersity of 2.38. The weight reduction ratio during heating ($\Delta$Wr) of the PPS resin composition obtained was measured to be 0.037%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 285° C. and 170° C., respectively. Using a rheometer, the solidification temperature was measured to be 219° C.

Example 5

A polymer was obtained in the same manner as in Example 1 except that the PPS obtained in Reference Example 3 in an amount of 4.0 g and barium acetate in an amount of 93.6 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 54,400 and a polydispersity of 2.38. The weight reduction ratio during heating ($\Delta$Wr) of the PPS resin composition obtained was measured to be 0.040%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 280° C. and 192° C., respectively. Using a rheometer, the solidification temperature was measured to be 230° C.

Example 6

A polymer was obtained in the same manner as in Example 1 except that the cyclic polyphenylene sulfide mixture obtained in Reference Example 3 in an amount of 4.0 g and calcium propionate in an amount of 68.2 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 54,200 and a polydispersity of 2.50. The weight reduction ratio during heating (ΔWr) of the PPS resin composition obtained was measured to be 0.045%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 280° C. and 184° C., respectively. Using a rheometer, the solidification temperature was measured to be 223° C.

Example 7

The cyclic polyphenylene sulfide mixture obtained in Reference Example 3 in an amount of 4.0 g and calcium stearate in an amount of 22.2 mg (0.1 mol % based on -(Ph-S)—, the repeating unit of the PPS) were placed in a test tube equipped with a stirring blade, a vacuum adapter, a vacuum stirrer, and a nitrogen inlet tube. The pressure in the system was reduced, and then the atmosphere was purged with nitrogen. This procedure was repeated three times. While being stirred under reduced pressure, the mixture was maintained at 340° C. for 8 hours. The stirring was stopped, and the mixture was allowed to cool to give a polymer. The polymer obtained was shown to have a polyphenylene sulfide structure by the absorption spectrum obtained by infrared spectroscopy. The PPS resin composition obtained was subjected to GPC and shown to have a weight average molecular weight of 61,300 and a polydispersity of 2.42. The weight reduction ratio during heating (ΔWr) of the PPS resin composition obtained was measured to be 0.045%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 278° C. and 189° C., respectively. Using a rheometer, the solidification temperature was measured to be 213° C.

Example 8

A polymer was obtained in the same manner as in Example 1 except that the cyclic polyphenylene sulfide mixture obtained in Reference Example 3 in an amount of 4.0 g and calcium stearate in an amount of 222 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 64,200 and a polydispersity of 2.68. The weight reduction ratio during heating (ΔWr) of the PPS resin composition obtained was measured to be 0.070%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 278° C. and 168° C., respectively. Using a rheometer, the solidification temperature was measured to be 203° C.

Example 9

A polymer was obtained in the same manner as in Example 1 except that the cyclic polyphenylene sulfide mixture obtained in Reference Example 3 in an amount of 4.0 g and barium stearate in an amount of 258 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 59,900 and a polydispersity of 2.57. The weight reduction ratio during heating (ΔWr) of the PPS resin composition obtained was measured to be 0.096%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 280° C. and 161° C., respectively. Using a rheometer, the solidification temperature was measured to be 199° C.

Example 10

A polymer was obtained in the same manner as in Example 1 except that the PPS obtained in Reference Example 3 in an amount of 4.0 g and calcium benzoate in an amount of 100 mg (1 mol % based on -(Ph-S)—, the repeating unit of the PPS) were used. The polymer obtained was shown to have a polyphenylene sulfide structure by the absorption spectrum obtained by infrared spectroscopy. The PPS resin composition obtained was subjected to GPC and shown to have a weight average molecular weight of 54,000 and a polydispersity of 2.40. The weight reduction ratio during heating (ΔWr) of the PPS resin composition obtained was measured to be 0.082%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 289° C. and 155° C., respectively. Using a rheometer, the solidification temperature was measured to be 192° C.

Comparative Example 1

A polymer was obtained in the same manner as in Example 1 except that the cyclic polyphenylene sulfide mixture obtained in Reference Example 3 in an amount of 4.0 g was used. The contents obtained were shown to have a polyphenylene sulfide structure by the absorption spectrum obtained by infrared spectroscopy. The PPS resin composition obtained was subjected to GPC and shown to have a weight average molecular weight of 58,900 and a polydispersity of 2.33. The weight reduction ratio during heating (ΔWr) of the PPS resin composition obtained was measured to be 0.041%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 283° C. and 227° C., respectively. Using a rheometer, the solidification temperature was measured to be 250° C.

Comparative Example 2

A polymer was obtained in the same manner as in Example 1 except that the cyclic polyphenylene sulfide mixture obtained in Reference Example 3 in an amount of 4.0 g and sodium 4-chlorophenyl acetate in an amount of 70.6 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 53,200 and a polydispersity of 2.43. The weight reduction ratio during heating (ΔWr) of the PPS resin composition obtained was measured to be 0.054%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 285° C. and 228° C., respectively. Using a rheometer, the solidification temperature was measured to be 250° C.

Comparative Example 3

A polymer was obtained in the same manner as in Example 1 except that the cyclic polyphenylene sulfide mixture obtained in Reference Example 3 in an amount of 4.0 g and sodium stearate in an amount of 112 mg (1 mol % based on -(Ph-S)—, the repeating unit of the PPS) were used. The contents obtained were shown to have a polyphenylene sulfide structure by the absorption spectrum obtained by infrared spectroscopy. The PPS resin composition obtained was subjected to GPC and shown to have a weight average molecular weight of 55,000 and a polydispersity of 2.48. The weight reduction ratio during heating (ΔWr) of the PPS resin composition obtained was measured to be 0.090%. Furthermore, for the PPS resin composition obtained here, gas components generated during heating were analyzed to show that the amounts of lactone compound and aniline compound were below the detection limit. Using a differential scanning calorimeter, the melting point and cooling-down melt crystallization temperature were measured to be 279° C. and 220° C., respectively. Using a rheometer, the solidification temperature was measured to be 240° C.

Comparative Example 4

The PPS obtained in Reference Example 4 in an amount of 1.5 kg and calcium acetate in an amount of 24.5 g (1 mol % based on -(Ph-S)—, the repeating unit of the PPS) were dry blended, melt compounded in a TEX30 model twin-screw compounding extruder available from The Japan Steel Works, LTD. at a cylinder temperature of 320° C. and a screw speed of 200 rpm, and pelletized with a strand cutter. The pellets obtained were subjected to GPC and shown to have a weight average molecular weight of 49,100 and a polydispersity of 3.55. The weight reduction ratio during heating (ΔWr) of the PPS resin composition obtained was measured to be 0.340%. Furthermore, for the PPS resin composition obtained here, gas components generated during heating were analyzed to show that 598 ppm of γbutyrolactone and 322 ppm of 4-chloro-N-methylaniline were detected, the ppm being based on the weight of the PPS resin composition that had not been heated. Using a differential scanning calorimeter, the melting point and cooling-down melt crystallization temperature were measured to be 280° C. and 222° C., respectively. Using a rheometer, the solidification temperature was measured to be 245° C.

Comparative Example 5

The PPS obtained in Reference Example 4 in an amount of 1.5 kg and calcium stearate in an amount of 83.4 g (1 mol % based on -(Ph-S)—, the repeating unit of the PPS) were dry blended, melt compounded in a TEX30 model twin-screw compounding extruder available from The Japan Steel Works, LTD. at a cylinder temperature of 320° C. and a screw speed of 200 rpm, and pelletized with a strand cutter. The pellets obtained were subjected to GPC and shown to have a weight average molecular weight of 49,100 and a polydispersity of 3.55. The weight reduction ratio during heating (ΔWr) of the PPS resin composition obtained was measured to be 0.368%. Furthermore, for the PPS resin composition obtained here, gas components generated during heating were analyzed to show that 598 ppm of γbutyrolactone and 322 ppm of 4-chloro-N-methylaniline were detected, the ppm being based on the weight of the PPS resin composition that had not been heated. Using a differential scanning calorimeter, the melting point and cooling-down melt crystallization temperature were measured to be 280° C. and 202° C., respectively. Using a rheometer, the solidification temperature was measured to be 231° C.

Figure 1:
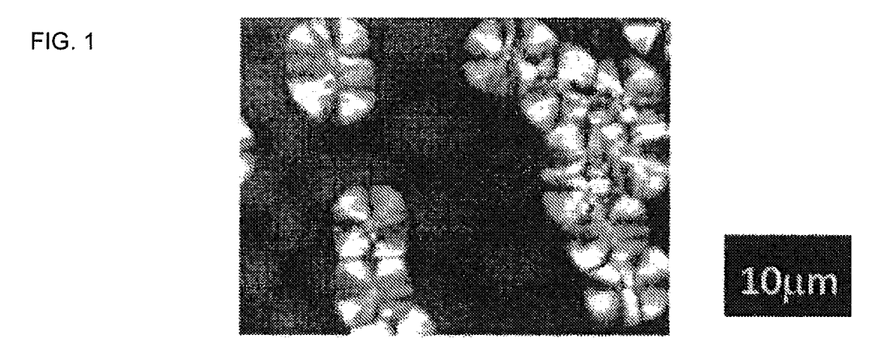
FIG. 1 is a polarizing micrograph of the state of crystals at 230° C. in the resin composition obtained in Example 3.
Figure 2:
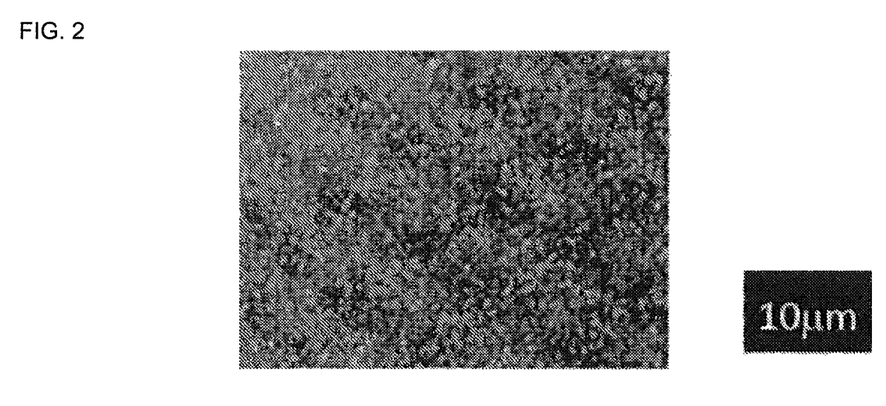
FIG. 2 is a polarizing micrograph of the state of crystals at 230° C. in the resin composition obtained in Comparative Example 1.

As is clear from the comparison between Examples 1 to 10 and Comparative Examples 1 to 3 in Table 1, the polyarylene sulfide resin compositions of the present invention containing alkaline earth metal salts have well-controlled crystallization properties. Furthermore, as shown in FIG. 1, the crystal observation of Example 3 and Comparative Example 1 showed that in the polyarylene sulfide composition of the present invention, spherulites tended to grow large because of retarded crystallization. As can be seen from Examples 2 and 3, in the present invention containing an alkaline earth metal salt of up to 4 carbon atoms, the amount of gas generation tends to be smaller. As can be seen from Examples 7 and 8, in the present invention containing an alkaline earth metal of 5 or more carbon atoms, the melt crystallization temperature and the solidification temperature can be easily reduced. As can be seen from the comparison between Examples 3 and 7 and Comparative Examples 4 and 5, using a polyarylene sulfide satisfying ΔWr≤0.18(%) provides a polyarylene sulfide resin composition having a small weight reduction on heating and a lowered melt crystallization temperature and solidification temperature.

TABLE 1

|  | Resin component | Carboxylate metal salt Type | Added amount (mol %) | Weight average molecular weight | ΔWr(%) | Cooling-down melt crystallization temperature (° C.) | Solidification temperature (° C.) |
|---|---|---|---|---|---|---|---|
| Example 1 | Reference Example 3 | Calcium acetate | 0.01 | 54,800 | 0.044 | 208 | 243 |
| Example 2 | Reference Example 3 | Calcium acetate | 0.1 | 53,900 | 0.034 | 190 | 231 |
| Example 3 | Reference Example 3 | Calcium acetate | 1 | 55,900 | 0.033 | 184 | 221 |
| Example 4 | Reference Example 3 | Calcium acetate | 3 | 56,200 | 0.037 | 170 | 219 |
| Example 5 | Reference Example 3 | Barium acetate | 1 | 54,400 | 0.040 | 192 | 230 |
| Example 6 | Reference Example 3 | Calcium propionate | 1 | 54,200 | 0.045 | 184 | 223 |
| Example 7 | Reference Example 3 | Calcium stearate | 0.1 | 61,300 | 0.045 | 189 | 213 |
| Example 8 | Reference Example 3 | Calcium stearate | 1 | 64,200 | 0.070 | 168 | 203 |
| Example 9 | Reference Example 3 | Barium stearate | 1 | 59,900 | 0.096 | 161 | 199 |
| Example 10 | Reference Example 3 | Calcium benzoate | 1 | 54,000 | 0.082 | 155 | 192 |
| Comparative Example 1 | Reference Example 3 | — | 0 | 58,900 | 0.041 | 227 | 250 |
| Comparative Example 2 | Reference Example 3 | Sodium 4-chlorophenyl | 1 | 53,200 | 0.054 | 228 | 250 |
| Comparative Example 3 | Reference Example 3 | Sodium stearate | 1 | 55,000 | 0.090 | 220 | 240 |
| Comparative Example 4 | Reference Example 4 | Calcium acetate | 1 | 49,100 | 0.340 | 222 | 245 |
| Comparative Example 5 | Reference Example 4 | Calcium stearate | 1 | 49,100 | 0.368 | 202 | 231 |

The polyarylene sulfide resin composition of the present invention can be molded by injection molding and extrusion molding into various molded parts such as films, sheets, and fibers and widely used in the fields of various electrical and electronic components, machine parts, automotive parts, and other parts requiring heat resistance and chemical resistance.

The invention claimed is:

1. A polyarylene sulfide resin composition comprising:
a polyarylene sulfide (A); and
an alkaline earth metal organic carboxylate (B) in an amount of 0.001 to 10 mol % based on the formula —(Ar—S)—, a repeating unit of polyarylene sulfide, wherein the polyarylene sulfide (A) has a weight average molecular weight of 10,000 or more and a weight reduction during heating that satisfies the following equation:

$$\Delta Wr=(W_1-W_2)/W_1\times 100\leq 0.18(\%)$$

wherein ΔWr is a weight reduction ratio (%) determined by a thermogravimetric analysis performed in a non-oxidizing atmosphere under normal pressure at a temperature rise rate of 20° C./min from 50° C. to any temperature equal to or higher than 330° C., wherein $W_1$ is a sample weight at 100° C., and $W_2$ is a sample weight at 330° C.

2. The polyarylene sulfide resin composition according to claim 1, wherein the alkaline earth metal organic carboxylate (B) is an alkaline earth metal carboxylate of up to 4 carbon atoms.

3. The polyarylene sulfide resin composition according to claim 1, wherein the alkaline earth metal organic carboxylate (B) is at least one selected from acetates, propionates, and butyrates.

4. The polyarylene sulfide resin composition according to claim 1, wherein the alkaline earth metal organic carboxylate (B) is an alkaline earth metal carboxylate of 5 or more carbon atoms.

5. The polyarylene sulfide resin composition according to claim 1, wherein the alkaline earth metal organic carboxylate (B) is at least one selected from stearates and benzoates.

6. The polyarylene sulfide resin composition according to claim 1, wherein the alkaline earth metal organic carboxylate (B) is at least one selected from calcium salts, barium salts, magnesium salts, and strontium salts.

7. The polyarylene sulfide resin composition according to claim 1, wherein the polyarylene sulfide (A) is a polyphenylene sulfide.

8. The polyarylene sulfide resin composition according to claim 7, wherein the polyphenylene sulfide (A) is a polyphenylene sulfide produced by thermally converting a polyphenylene sulfide prepolymer containing at least 50% by weight of a cyclic polyphenylene sulfide and having a weight average molecular weight of less than 10,000 into a high polymer having a weight average molecular weight of 10,000 or more, the cyclic polyphenylene sulfide being represented by Formula (i):

(i)

wherein m is an integer of 4 to 20, and the cyclic polyphenylene sulfide may be a mixture of chemical compounds being represented by Formula (i) having different m of 4 to 20.

9. A molded article made of the polyarylene sulfide resin composition according to claim 1.

10. The molded article according to claim 9 which is in at least one form selected from fibers and films.

* * * * *